United States Patent
Liang et al.

(10) Patent No.: US 11,447,702 B2
(45) Date of Patent: *Sep. 20, 2022

(54) LIQUID CRYSTAL COMPOSITION, LIQUID CRYSTAL DISPLAY ELEMENT AND LIQUID CRYSTAL DISPLAY

(71) Applicant: Shijiazhuang Chengzhi Yonghua Display Material Co., Ltd., Hebei (CN)

(72) Inventors: Ruixiang Liang, Hebei (CN); Sumin Kang, Hebei (CN); Gang Wen, Hebei (CN); Qing Cui, Hebei (CN); Hongru Gao, Hebei (CN); Yuanyuan Li, Hebei (CN); Jikai Li, Hebei (CN); YanLi Dong, Hebei (CN); Xinxia Wang, Hebei (CN)

(73) Assignee: SHIJIAZHUANG CHENGZHI YONGHUA DISPLAY MATERIAL CO., LTD., Hebei (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/251,593

(22) PCT Filed: Apr. 3, 2020

(86) PCT No.: PCT/CN2020/083213
§ 371 (c)(1),
(2) Date: Dec. 11, 2020

(87) PCT Pub. No.: WO2021/134961
PCT Pub. Date: Jul. 8, 2021

(65) Prior Publication Data
US 2021/0355382 A1  Nov. 18, 2021

(30) Foreign Application Priority Data
Dec. 30, 2019 (CN) .......................... 201911394883.8

(51) Int. Cl.
G02F 1/1333 (2006.01)
C09K 19/34 (2006.01)
C09K 19/04 (2006.01)

(52) U.S. Cl.
CPC ...... *C09K 19/3491* (2013.01); *C09K 19/3405* (2013.01); *C09K 2019/0448* (2013.01); *C09K 2019/3408* (2013.01)

(58) Field of Classification Search
CPC ............ C09K 19/3491; C09K 19/3405; C09K 19/3066; C09K 19/3098; C09K 19/44; C09K 2019/0448; C09K 2019/3408; C09K 2019/122; C09K 2019/123; C09K 2019/3004; C09K 2019/3009; 09K 2019/301; C09K 2019/3016; C09K 2019/3021; C09K 2019/3027; G02F 1/1333
See application file for complete search history.

(56) References Cited

U.S. PATENT DOCUMENTS

2019/0390112 A1  12/2019  Hirschmann
2021/0301205 A1*  9/2021  Zhang ................ C09K 19/3491

FOREIGN PATENT DOCUMENTS

| CN | 103459554 A | 12/2013 |
| CN | 107257839 A | 10/2017 |
| CN | 110527522 A | 12/2019 |

* cited by examiner

*Primary Examiner* — Geraldina Visconti
(74) *Attorney, Agent, or Firm* — Muncy, Geissler, Olds & Lowe, P.C.

(57) ABSTRACT

A liquid crystal composition, a liquid crystal display element and a liquid crystal display comprising the liquid crystal composition belong to the field of liquid crystal display. The liquid crystal composition of the present disclosure comprises a compound represented by formula I, a compound represented by formula II, one or more compounds represented by formula III, one or more compounds represented by formula IV and more than three compounds represented by formula V. The liquid crystal composition has low rotational viscosity γ1 and high stability to heat and light on the basis of maintaining appropriate optical anisotropy Δn, which can realize fast response of liquid crystal display.

4 Claims, No Drawings

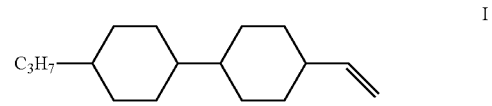

I

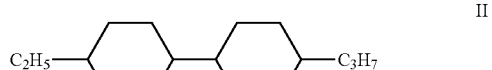

II

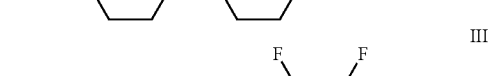

III

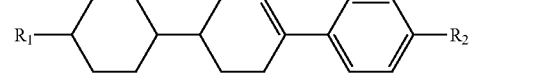

IV

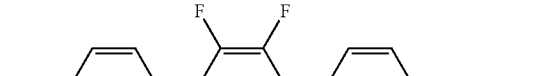

V

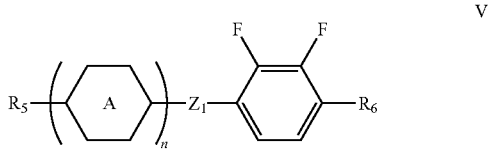

LIQUID CRYSTAL COMPOSITION, LIQUID CRYSTAL DISPLAY ELEMENT AND LIQUID CRYSTAL DISPLAY

TECHNICAL FIELD

The present invention relates to the field of liquid crystal display, in particular to a liquid crystal composition and a liquid crystal display element or liquid crystal display containing the liquid crystal composition.

BACKGROUND ART

With the progress of the times, liquid crystal display has become the mainstream display device, and the application range of liquid crystal compounds has been expanded more and more widely, not only in various types of displays, but also in electro-optic devices, sensors, liquid crystal antennas, etc. Liquid crystal display is a kind of display which uses liquid crystal as material. Liquid crystal is a kind of organic compound between solid and liquid state. At room temperature, it has both liquid fluidity and crystal optical anisotropy. When heated, it will become transparent liquid, and after cooling, it will become crystal turbid solid.

With the development of the market, people have higher and higher requirements for the resolution of liquid crystal display elements. For example, 4K/8K TV came into being in the market. High resolution requires faster response time of liquid crystal. As a liquid crystal material, the response time of liquid crystal is directly affected by the viscosity of liquid crystal compound, especially the rotational viscosity $\gamma_1$.

Therefore, in order to meet the market requirements of high resolution and improve the response time of liquid crystal display elements, higher requirements are put forward for the rotational viscosity $\gamma_1$ of liquid crystal composition used in liquid crystal display elements.

The liquid crystal medium used in the display elements of FFS mode, IPS mode and VA mode is not perfect. For the liquid crystal material used in the display device, it is required to have ① low driving voltage: the liquid crystal material has appropriate negative dielectric anisotropy; ② fast response: the liquid crystal material has appropriate optical anisotropy; ③ high reliability: high charge retention rate, high specific resistance, excellent high temperature stability and strict requirements for stability of UV light or conventional backlight lighting. However, when our liquid crystal materials meet the basic characteristics (low driving voltage, fast response) required by the above display, the reliability problems will be exposed one by one, especially the stability of UV light becomes worse. Therefore, to solve the reliability of such liquid crystal media has become a thorny problem.

SUMMARY OF THE INVENTION

In order to solve at least one problem in the prior art, the inventors and others found that the liquid crystal composition provided by the present disclosure has low rotational viscosity $\gamma_1$ and high thermal and optical stability on the basis of maintaining appropriate optical anisotropy $\Delta n$.

Another object of the present disclosure is to provide a liquid crystal display element or liquid crystal display, which comprises a liquid crystal composition display element or a liquid crystal display of the present disclosure, which has a wide nematic temperature range, suitable birefringence anisotropy, very high resistivity, good ultraviolet resistance and fast response time, and can be widely used in 4K and 8K displays.

To achieve the above purpose, the present disclosure adopts the following technical solutions:

The present disclosure provides a liquid crystal composition, which comprises a compound represented by formula I, a compound represented by formula II, one or more compounds represented by formula III, one or more compounds represented by formula IV and more than three compounds represented by formula V:

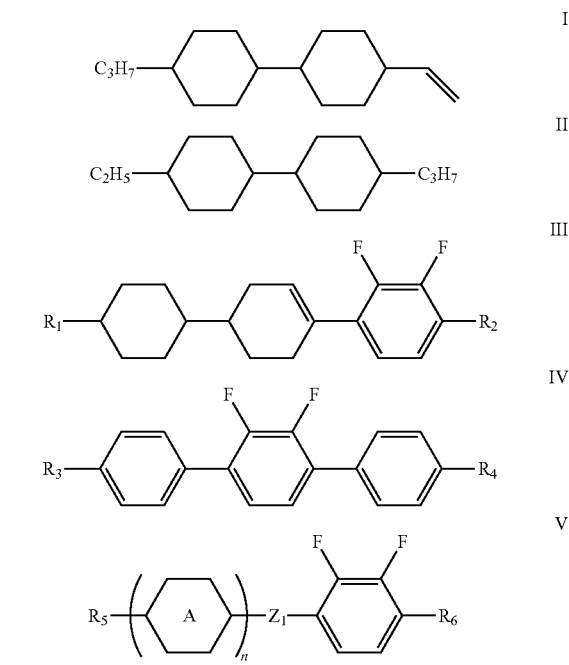

wherein, $R_1$, $R_2$, $R_3$, $R_4$, $R_5$ and $R_6$ independently represent alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10, alkenyl group having a carbon atom number of 2-10, fluoro-substituted alkenyl group having a carbon atom number of 2-10, alkenoxy group having a carbon atom number of 3-8 or fluoro-substituted alkenoxy group having a carbon atom number of 3-8;

and, any one —$CH_2$— or several —$CH_2$— that are not adjacent of the groups indicated by $R_1$, $R_3$ and $R_5$ are selectively substituted by cyclopentyl, cyclobutyl or cyclopropyl;

$Z_1$ represents a single bond, —$CH_2CH_2$— or —$CH_2O$—;

n represents 0, 1 or 2;

when n represents 1,

represents 1,4-Phenylene, 1,4-cyclohexylidene or 1,4-cyclohexene;

when n represents 2, two

are either the same or different, and each of them independently represents 1,4-Phenylene or 1,4-cyclohexylidene.

The liquid crystal composition of the present disclosure has low rotational viscosity $\gamma_1$ and high thermal and light stability on the basis of maintaining appropriate optical anisotropy $\Delta n$.

The invention also provides a liquid crystal display element, which comprises a liquid crystal composition of the present disclosure. The liquid crystal display element is an active matrix addressing display element or a passive matrix addressing display element.

The present disclosure also provides a liquid crystal display comprising a liquid crystal composition of the present disclosure. The liquid crystal display is an active matrix addressing display or a passive matrix addressing display.

DETAILED DESCRIPTION OF EMBODIMENTS

[Liquid Crystal Composition]

The liquid crystal composition of the present disclosure comprises a compound represented by formula I, a compound represented by formula II, one or more compounds represented by formula III, one or more compounds represented by formula IV, and more than three compounds represented by formula V:

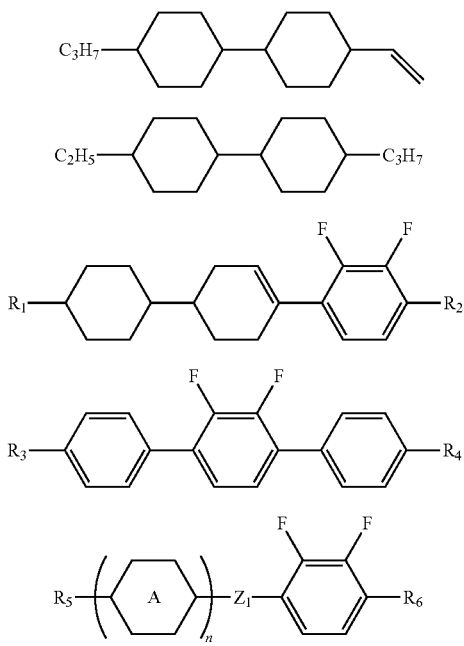

wherein, $R_1$, $R_2$, $R_3$, $R_4$, $R_5$ and $R_6$ independently represent alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10, alkenyl group having a carbon atom number of 2-10, fluoro-substituted alkenyl group having a carbon atom number of 2-10, alkenoxy group having a carbon atom number of 3-8 or fluoro-substituted alkenoxy group having a carbon atom number of 3-8;

and, any one —$CH_2$— or several —$CH_2$— that are not adjacent in the groups indicated by $R_1$, $R_3$ and $R_5$ are selectively substituted by cyclopentyl, cyclobutyl or cyclopropyl;

$Z_1$ represents a single bond, —$CH_2CH_2$— or —$CH_2O$—;

n represents 0, 1 or 2;

when n represents 1,

represents 1,4-Phenylene, 1,4-cyclohexylidene or 1,4-cyclohexene;

when n represents 2,

independently represent 1,4-Phenylene or 1,4-cyclohexylidene.

The liquid crystal composition of the present disclosure has low rotational viscosity and high thermal and light stability on the basis of maintaining appropriate optical anisotropy $\Delta n$.

For example, methyl, ethyl, n-propyl, isopropyl, n-butyl, isobutyl, tert butyl, n-amyl, isoamyl, hexyl, heptyl, octyl, nonyl, decyl, etc. can be listed as the alkyl groups with carbon atom number of 1-10.

For example, methoxy, ethoxy, n-propoxy, isopropoxy, n-butoxy, isobutoxy, pentoxy, hexoxy, hepthoxy, octyloxy, nonoxy, decaoxy, etc. can be listed as the alkoxy groups with the carbon atom number of 1~10.

For example, vinyl, 1-propenyl, 1-butenyl, 2-butenyl, 3-butenyl, 1-pentenyl, 2-pentenyl, 3-butenyl, 1-pentenyl, 2-pentenyl, 3-pentenyl, 4-Pentenyl, 1-hexenyl, 2-hexenyl, 3-Hexenyl, etc., can be listed as alkenyl groups with carbon atom number of 2~10.

The "fluoro-substituted" in the fluoro-substituted alkyl group having a carbon atom number of 1-10, fluoro-substituted alkoxy group with the carbon atom number of 1-10, fluoro-substituted alkenyl group having a carbon atom number of 2-10, and fluoro-substituted alkenoxy group having a carbon atom number of 3-8 can be single fluorine substitution, or multi fluorine substitution, such as difluoro substitution and trifluoro substitution, or perfluoro substitution. There is no special algebra for fluorine limitation. For example, fluoromethyl, difluoromethyl, trifluoromethyl, 1-fluoroethyl, 2-fluoroethyl, 1,2-difluoroethyl, 1,1,2-trifluoroethyl, 1,1,2-trifluoroethyl, 1,1,2-trifluoroethyl, 1,1,1,2,2-pentafluoroethyl, etc. can be listed, but not limited to.

In the liquid crystal composition of the present disclosure, there is no special restriction on the content of the compounds of the formula I, II, III and IV as the composition thereof. In a preferred embodiment, the total mass content of the compounds represented by formula I and formula II is 20-50%, the total mass content of the compound represented by formula III is 1-15%, the total mass content of the compound represented by formula IV is 1-20%, and the total mass content of the compound represented by formula V is 1-40%.

In the liquid crystal composition of the present disclosure, the compound represented by formula III is preferably selected from the group consisting of compounds represented by formula III-1 to III-12:
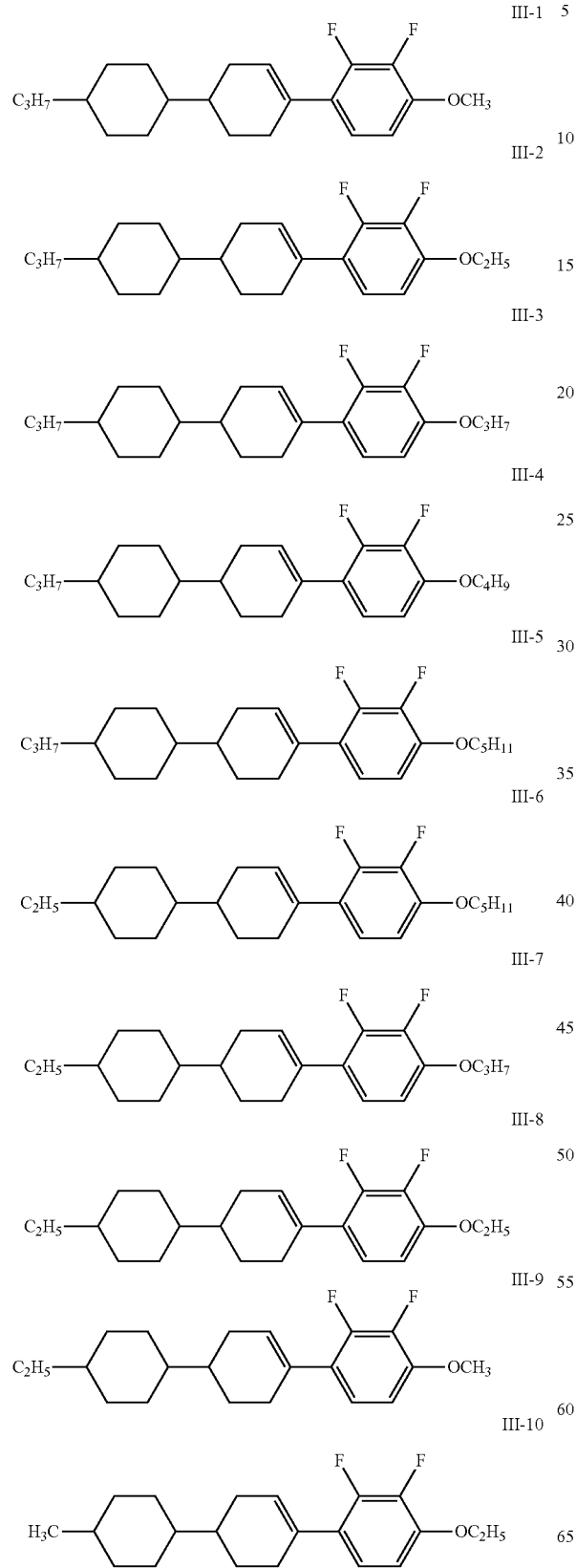
-continued
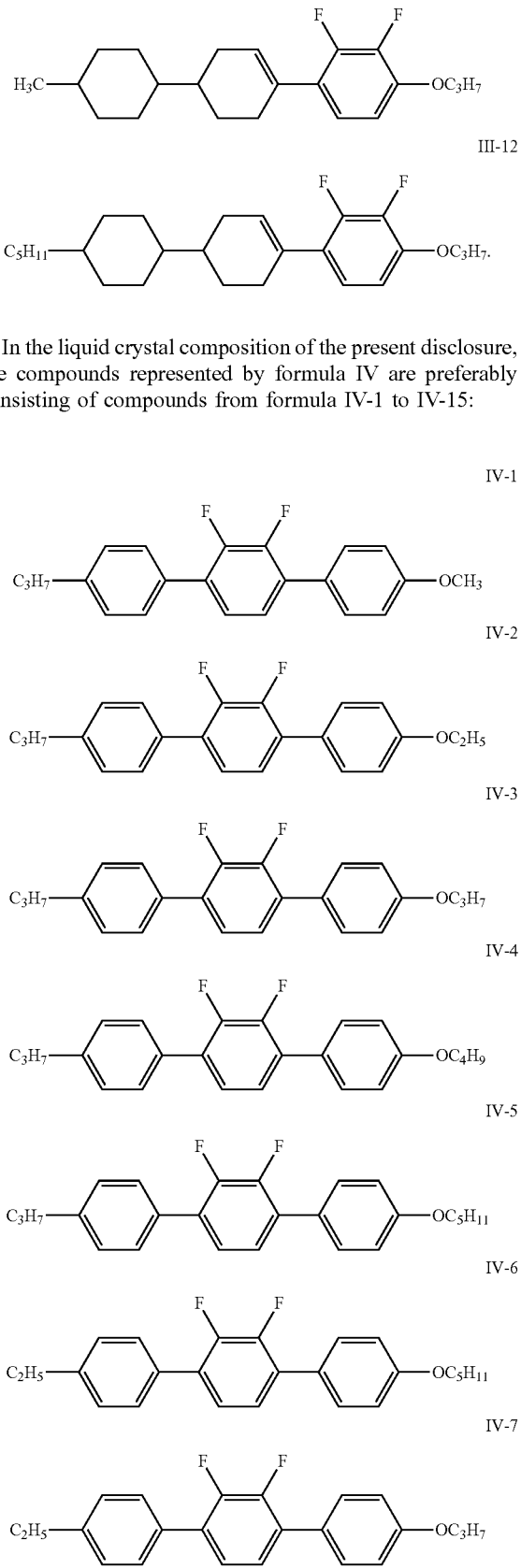
In the liquid crystal composition of the present disclosure, the compounds represented by formula IV are preferably consisting of compounds from formula IV-1 to IV-15:

IV-8
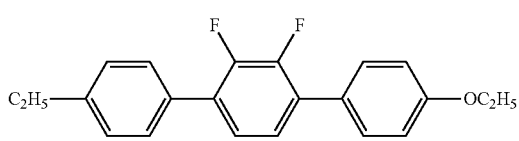

IV-9
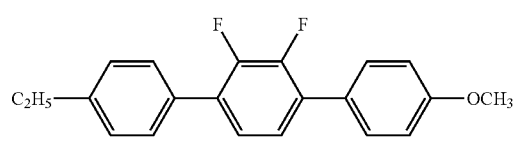

IV-10
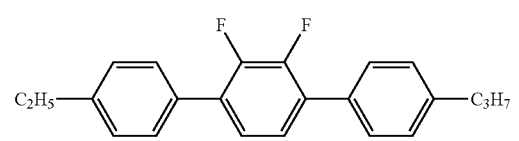

IV-11
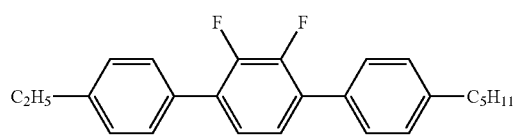

IV-12
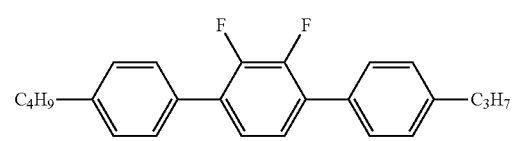

IV-13
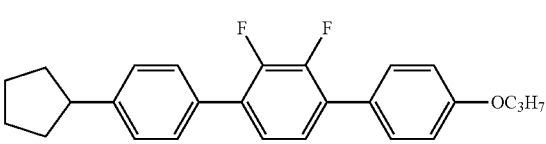

IV-14
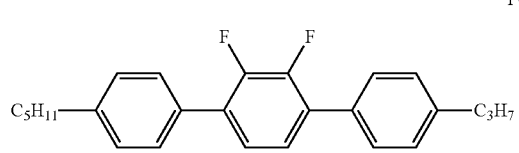

IV-15
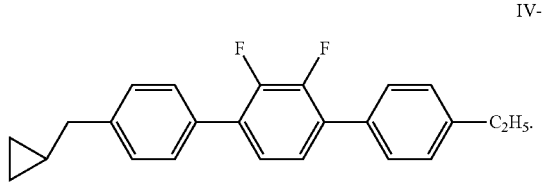

In the liquid crystal composition of the present disclosure, the compounds represented by formula V are preferably selected from the group consisting of compounds of V-1 to V-8:

V-1
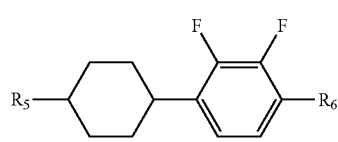

V-2
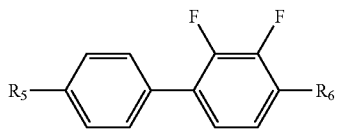

V-3
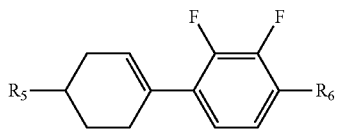

V-4
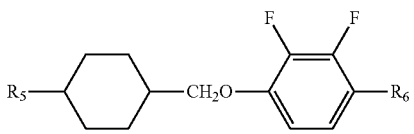

V-5
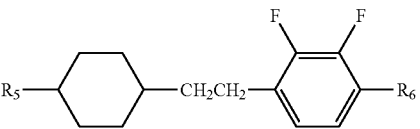

V-6
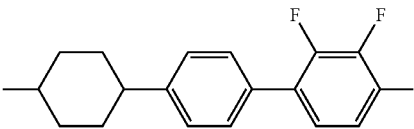

V-7
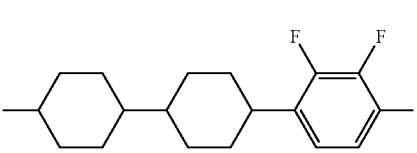

V-8
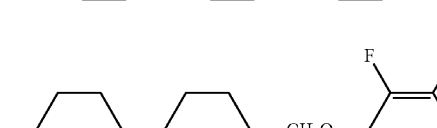

wherein, $R_5$ and $R_6$ independently represent alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10, alkenyl group having a carbon atom number of 2-10, fluoro-substituted alkenyl group having a carbon atom number of 2-10, alkenoxy group having a carbon atom number of 3-8 or fluoro-substituted alkenoxy group having a carbon atom number of 3-8;

and, any one —CH$_2$— or several —CH$_2$— that are not adjacent in $R_5$ group is selectively substituted by cyclopentyl, cyclobutyl or cyclopropyl.

In one embodiment of the liquid crystal composition, preferably, the liquid crystal composition also comprises one or more compounds represented by formula VI:

VI
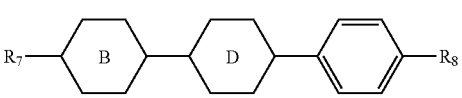

wherein, $R_7$ and $R_8$ independently represent alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10, alkenyl group having a carbon atom number of 2-10, fluoro-substituted alkenyl group having a carbon atom number of 2-10, alkenoxy group having a carbon atom number of 3-8 or fluoro-substituted alkenoxy group having a carbon atom number of 3-8;

independently represent 1,4-Phenylene, 1,4-cyclohexylidene or 1,4-cyclohexene.

By combining the compounds represented by formula VI in the liquid crystal composition of the present disclosure, the optical anisotropy of the liquid crystal composition can be increased and the clear point of the liquid crystal composition can be improved.

In one embodiment of the liquid crystal composition of the present disclosure, preferably, the compound represented by formula VI is preferably consisting of compounds from formula VI-1 to VI-7:

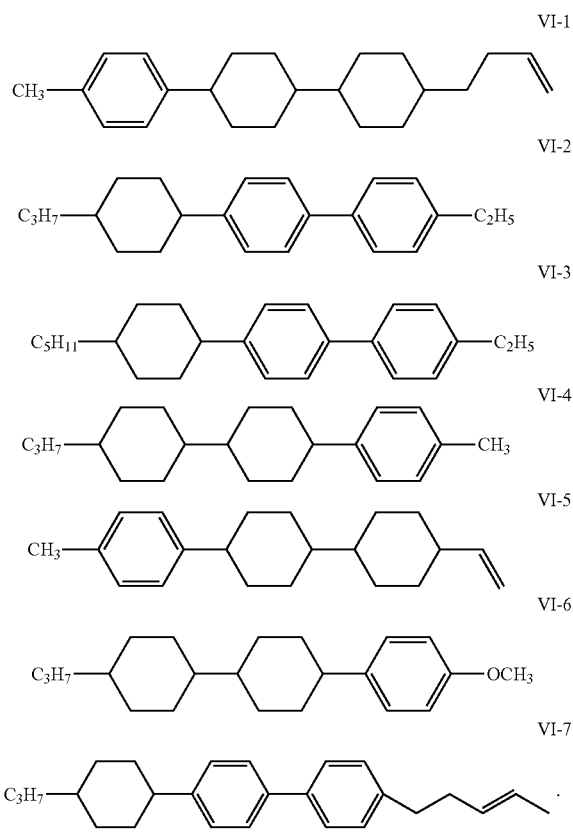

In another embodiment of the liquid crystal composition disclosed, preferably, the liquid crystal composition further comprises one or more compounds represented by formula VII:

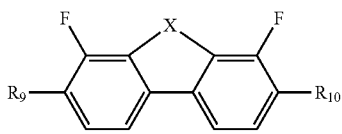

wherein, $R_9$ and $R_{10}$ independently represent alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10, alkenyl group having a carbon atom number of 2-10, fluoro-substituted alkenyl group having a carbon atom number of 2-10, alkenoxy group having a carbon atom number of 3-8 or fluoro-substituted alkenoxy group having a carbon atom number of 3-8, any one —$CH_2$— or several —$CH_2$— that are not adjacent in the groups indicated by $R_9$ and $R_{10}$ are selectively substituted by cyclopentyl, cyclobutyl or cyclopropyl;

X represents —O—, —S— or —$CH_2O$—.

By using the compound represented by formula VII in the liquid crystal composition of the present disclosure, the liquid crystal composition can have large negative dielectric anisotropy, which is conducive to reducing the driving voltage of the device.

In another embodiment of the liquid crystal composition of the present disclosure, it is preferred that the compounds represented by formula VII are selected from the group consisting of the compounds represented by formulas VII-1 to VII-12:

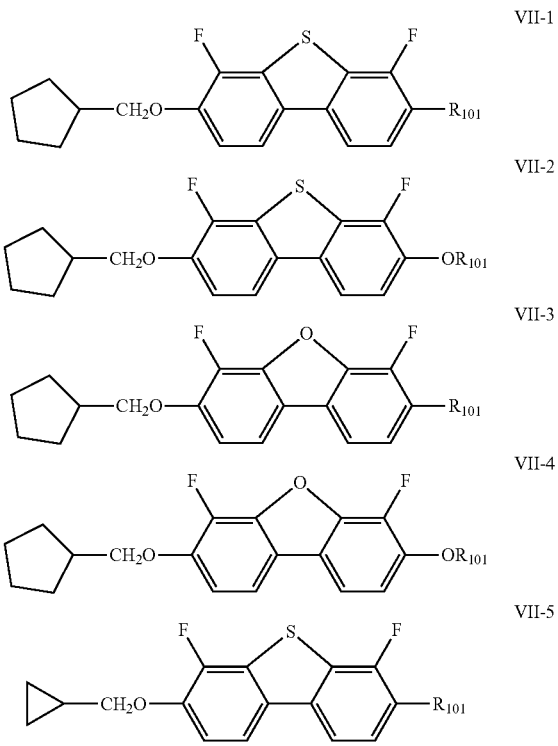

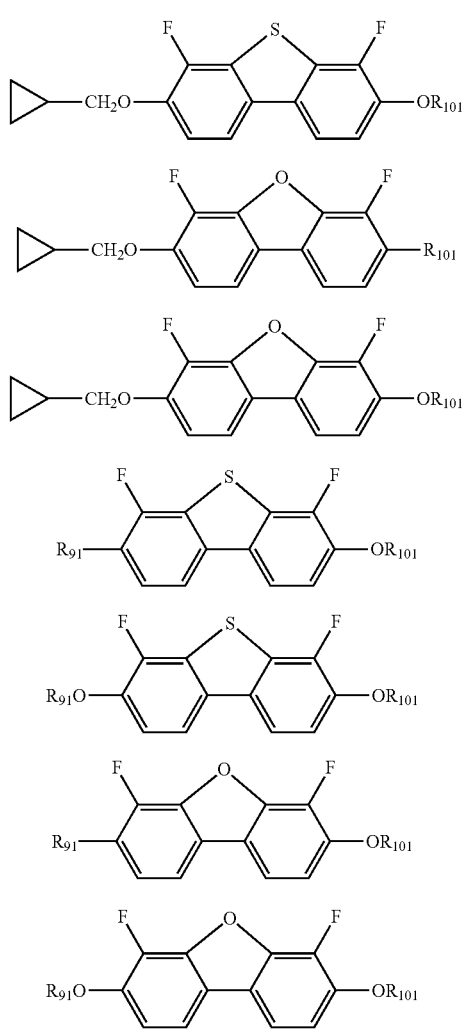

independently represent 1,4-Phenylene, 1,4-cyclohexylidene or 1,4-cyclohexene.

By containing the compound represented by formula VIII in the liquid crystal composition of the present disclosure, the mutual solubility of the liquid crystal composition can be improved, the rotational viscosity can be reduced, and the response speed of the liquid crystal composition of the present disclosure can be improved.

In another embodiment of the liquid crystal composition of the present disclosure, it is preferred that the compounds represented by formula VIII are selected from the group consisting of compounds represented by formulas VIII-1 to VIII-9:

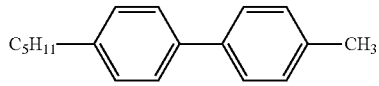

VIII-1

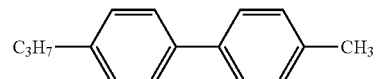

VIII-2

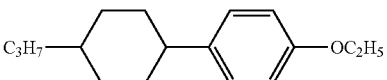

VIII-3

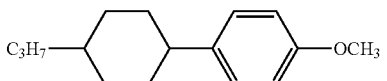

VIII-4

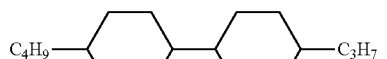

VIII-5

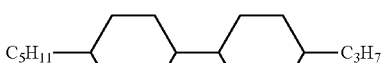

VIII-6

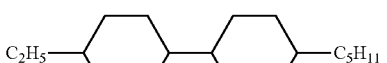

VIII-7

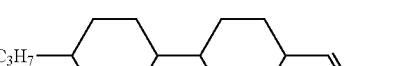

VIII-8

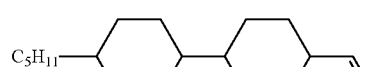

VIII-9

VIII-10 wherein, $R_{91}$ and $R_{101}$ independently represent alkyl groups with 1-10 carbon atoms.

In a further embodiment of the liquid crystal composition of the invention, it is preferred that the liquid crystal composition also comprises one or more compounds represented by formula VIII except for those represented by formula I and II:

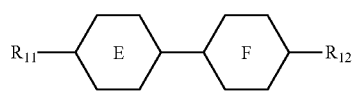

VIII $R_{11}$ and $R_{12}$ independently represent alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10, alkenyl group having a carbon atom number of 2-10, fluoro-substituted alkenyl group having a carbon atom number of 2-10, alkenoxy group having a carbon atom number of 3-8 or fluoro-substituted alkenoxy group having a carbon atom number of 3-8;

In another embodiment of the liquid crystal composition disclosed, preferably, the liquid crystal composition further comprises one or more compounds represented by formula IX:

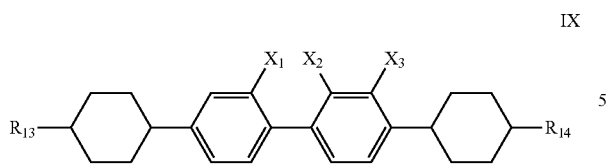

wherein, $R_{13}$ and $R_{14}$ independently represent alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10, alkenyl group having a carbon atom number of 2-10, fluoro-substituted alkenyl group having a carbon atom number of 2-10, alkenoxy group having a carbon atom number of 3-8 or fluoro-substituted alkenoxy group having a carbon atom number of 3-8;

$X_1$, $X_2$, $X_3$ independently represent H or F.

By containing the compound represented by formula IX in the liquid crystal composition of the present disclosure, the brightness point of the liquid crystal composition can be improved.

In another embodiment of the liquid crystal composition of the present disclosure, it is preferred that the compounds represented by formula IX are selected from the group consisting of the compounds represented by formulas IX-1 to IX-5:

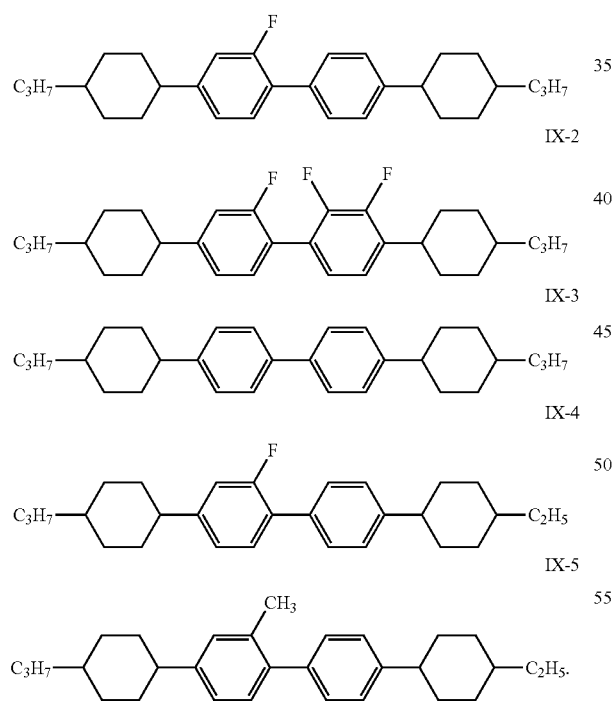

Various functional dopants can also be added to the liquid crystal compound of the present disclosure, and the dopant content is preferably between 0.01% and 1%. These dopants can be listed as antioxidants, ultraviolet absorbents and chiral agents.

Antioxidants, UV absorbers may be preferably listed as follows:

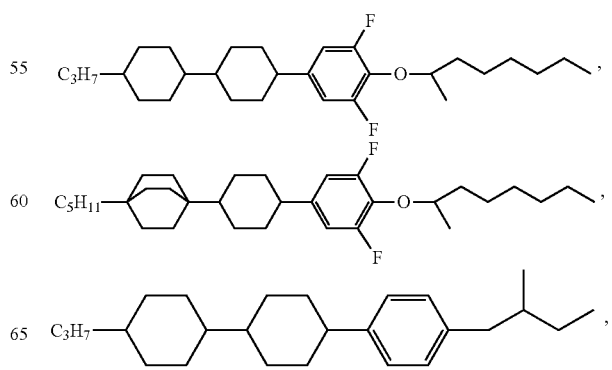

S represents an integer from 1 to 10.

Chiral agents (left-handed or right-handed) are preferred can be listed as follows:

-continued

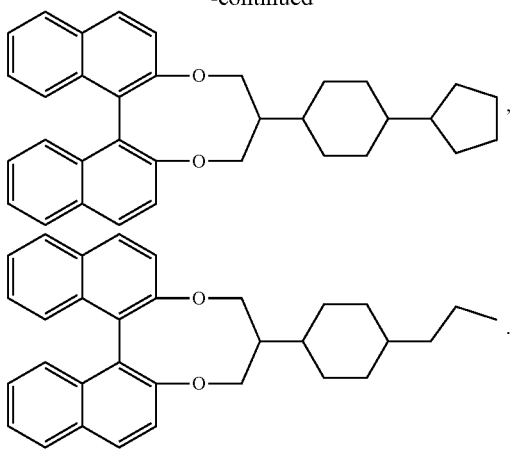

The present disclosure also relates to a liquid crystal display element or a liquid crystal display comprising any one of the above liquid crystal compositions; the display element or display is an active matrix display element or display or a passive matrix display element or display.

The liquid crystal display element or liquid crystal display of the present disclosure preferably adopts active matrix addressing liquid crystal display element or liquid crystal display.

The above-mentioned active matrix display elements or displays can specifically list TN-TFT or IPS-TFT or VA-TFT liquid crystal display elements or other TFT displays.

The liquid crystal composition provided by the present disclosure has low rotational viscosity $\gamma_1$ and high thermal and light stability on the basis of maintaining appropriate optical anisotropy $\Delta n$.

[Liquid Crystal Display Element or Liquid Crystal Display]

The liquid crystal display element or liquid crystal display of the present disclosure comprises a liquid crystal composition of the present disclosure. The liquid crystal display element or liquid crystal display of the present disclosure has a wide nematic temperature range, suitable birefringence anisotropy, very high resistivity, good ultraviolet resistance and fast response time, and can be widely used in 4K and 8K displays.

EMBODIMENTS

In order to explain the present disclosure more clearly, the present disclosure will be further explained in combination with the embodiment. Those skilled in the art should understand that the contents described below are illustrative rather than restrictive, and the scope of protection of the present disclosure should not be limited.

In this manual, unless otherwise specified, the percentage refers to the mass percentage, and the temperature is degree centigrade (° C.). The specific meaning and test conditions of other symbols are as follows:

Cp is the clear point of liquid crystal (° C.), which is measured by DSC quantitative method;

$\Delta n$ is the optical anisotropy, $n_o$ is the refractive index of ordinary light, $n_e$ is the refractive index of extraordinary light, the test conditions are 25±2° C., 589 nm, Abbe refractometer test;

$\Delta \varepsilon$ is the dielectric anisotropy, $\Delta \varepsilon = \varepsilon_\parallel - \varepsilon_\perp$, where $\varepsilon_\parallel$ is the dielectric constant parallel to the molecular axis, and $\varepsilon_\perp$ is the dielectric constant perpendicular to the molecular axis. The test conditions are 25±0.5° C., 20 um vertical box, INSTEC:ALCT-IR1 testing;

$\gamma_1$ is the rotational viscosity (mPa·s), and the test conditions are 25±0.5° C. and 20 um vertical box, INSTEC: ALCT-IR1 testing;

$K_{11}$ is the torsional elastic constant and $K_{33}$ is the unfolding elastic constant INSTEC:ALCT-IR1, 20 um vertical box;

VHR is the voltage retention rate (%), the test condition is 60±1° C., the voltage is ±5V, the pulse width is 10 ms, and the voltage holding time is 1.667 ms. The test equipment is TOYO Model6254 liquid crystal performance comprehensive tester;

The preparation method of the liquid crystal composition is as follows: each liquid crystal monomer is weighed according to a certain proportion and put into a stainless steel beaker; the stainless steel beaker containing each liquid crystal monomer is heated and melted on the magnetic stirring instrument; after most of the liquid crystal monomer in the stainless steel beaker is melted, a magnetic rotor is added into the stainless steel beaker, and the mixture is stirred evenly and cooled to room temperature to obtain liquid crystal composition.

The structure of liquid crystal monomer in the embodiment of the disclosure is represented by codes. The codes for ring structures, end groups and linking groups of liquid crystals are represented as in Tables 1 and 2 below.

TABLE 1

Corresponding codes for ring structure

| Ring structure | Corresponding code |
|---|---|
|  | C |
|  | P |
|  | L |
|  | G |
|  | Gi |
|  | Y |
|  | Sb |

TABLE 1-continued

Corresponding codes for ring structure

| Ring structure | Corresponding code |
|---|---|
| 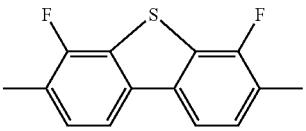 | Sc |

TABLE 2

Corresponding codes of end group and linking group

| End group and linking group | Corresponding code |
|---|---|
| $C_nH_{2n+1}$— | n- |
| $C_nH_{2n+1}O$— | nO— |
| —$CF_3$ | —T |
| —$OCF_3$ | —OT |
| —$CH_2O$— | —O— |
| —F | —F |
| —$CH_2CH_2$— | —E— |
| —CH=CH— | —V— |
| —CH=CH—$C_nH_{2n+1}$ | Vn- |
| 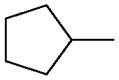 | Cp- |
|  | Cpr- |
|  | Cpr1- |
| 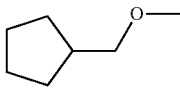 | CpO |
| 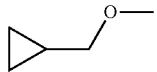 | CprO |

EXAMPLES

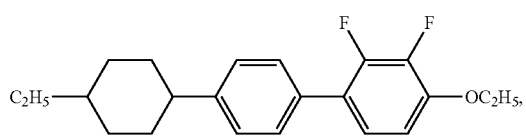

the code is CPY-2-O2;

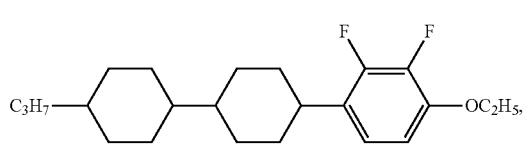

the code is CCY-3-O2;

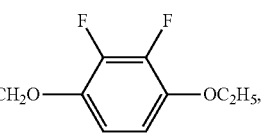

the code is COY-3-O2;

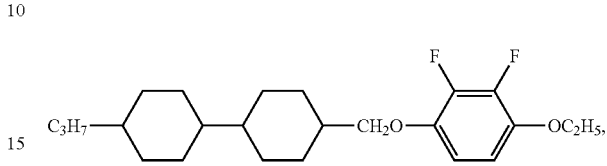

the code is CCOY-3-O2;

the code is Sb-CpO-O4;

the code is Sc-CpO-O4.

Example 1

The formula and corresponding properties of the liquid crystal composition are as shown in table 3.

TABLE 3

Formula and corresponding properties of liquid crystal composition of example 1

| Category | Liquid crystal monomer code | Content (%) |
|---|---|---|
| I | CC-3-V | 15 |
| II | CC-2-3 | 6.5 |
| III | CLY-3-O2 | 12 |
| IV | PYP-2-3 | 8 |
| V | CY-3-O2 | 8.5 |
| V | PY-3-O2 | 11.5 |
| V | CCY-3-O1 | 4.5 |
| VI | CCP-3-1 | 16 |
| VII | Sc-2O-O5 | 3 |
| VII | Sb-2O-O5 | 4 |
| VIII | CC-3-V1 | 7 |
| VIII | CC-4-3 | 4 |

Δε[1 KHz, 25° C.]: −3.0
Δn[589 nm, 25° C.]: 0.105
$K_{11}$: 13.5
$K_{33}$: 15.8
Cp: 81° C.
$γ_1$: 77 mPa·s

Comparative Example 1

The formula and corresponding properties of the liquid crystal composition are as shown in table 4 below.

TABLE 4

Formula and corresponding properties of liquid crystal composition with Comparative Example 1

| Category | Liquid crystal monomer code | Content (%) |
|---|---|---|
| I | CC-3-V | 15 |
| II | CC-2-3 | 6.5 |
| V | CCY-3-O2 | 12 |
| IV | PYP-2-3 | 8 |
| V | CY-3-O2 | 8.5 |
| V | PY-3-O2 | 11.5 |
| V | CCY-3-O1 | 4.5 |
| VI | CCP-3-1 | 16 |
| VII | Sc-2O-O5 | 3 |
| VII | Sb-2O-O5 | 4 |
| VIII | CC-3-V1 | 7 |
| VIII | CC-4-3 | 4 |

$\Delta\varepsilon$[1 KHz, 25° C.]: −3.0
$\Delta n$[589 nm, 25° C.]: 0.103
$K_{11}$: 13.1
$K_{33}$: 15.5
Cp: 80° C.
$\gamma_1$: 82 mPa · s For Comparative Example 1, CLY-3-O2 in Example 1 is replaced with CCY-3-O2, and the rest is the same as that of Example 1. Compared with the Comparative Example 1, $\gamma_1$ in Example 1 of the present disclosure is significantly reduced, and the response speed of the liquid crystal display can be improved.

Example 2

The formula and corresponding properties of the liquid crystal composition are as shown in table 5.

TABLE 5

Formula and corresponding properties of liquid crystal composition of example 2

| Category | Liquid crystal monomer code | Content (%) |
|---|---|---|
| I | CC-3-V | 15 |
| II | CC-2-3 | 13.5 |
| III | CLY-3-O2 | 12 |
| IV | PYP-2-3 | 8 |
| V | PY-3-O2 | 11.5 |
| V | CCY-3-O1 | 4.5 |
| V | CY-3-O2 | 8.5 |
| VI | CCP-3-1 | 16 |
| VII | Sc-2O-O5 | 3 |
| VII | Sb-2O-O5 | 4 |
| VIII | CC-4-3 | 4 |

$\Delta\varepsilon$[1 KHz, 25° C.]: −3.1
$\Delta n$[589 nm, 25° C.]: 0.106
Cp: 72° C.
$K_{11}$: 12.3
$K_{33}$: 13.3
$\gamma_1$: 63 mPa · s

Comparative Example 2

The formula and corresponding properties of the liquid crystal composition are as shown in table 6.

TABLE 6

Formula and performance of liquid crystal composition with Comparative Example 2

| Category | Liquid crystal monomer code | Content (%) |
|---|---|---|
| I | CC-3-V | 15 |
| VIII | CC-V-V | 13 |
| V | CCY-3-O2 | 12 |
| IV | PYP-2-3 | 8 |
| V | CY-3-O2 | 8 |
| V | PY-3-O2 | 12 |
| V | CPY-3-O2 | 7 |
| VI | CCP-3-1 | 10 |
| VII | Sc-2O-O5 | 3 |
| VII | Sb-2O-O5 | 4 |

$\Delta\varepsilon$[1 KHz, 25° C.]: −3.0
$\Delta n$[589 nm, 25° C.]: 0.105
Cp: 73° C.
$K_{11}$: 12.0
$K_{33}$: 14.0
$\gamma_1$: 71 mPa · s CLY-3-O2 was replaced with CCY-3-O2 and CC-2-3 was replaced with CC-V-V in example 2, and the rest were the same as those in example 2, as the corresponding Comparative Example 2. Compared with the Comparative Example 2, the $\gamma_1$ in the example 2 of the present disclosure is decreased.

TABLE 7

VHR control values of Example 2 and Comparative Example 2

| Experiment number | VHR initial (60° C., 0.6 Hz) | VHR UV (60° C., 0.6 Hz) | VHR high temperature (60° C., 0.6 Hz) |
|---|---|---|---|
| Example 2 | 76.5% | 86.2% | 95.2% |
| Comparative Example 2 | 72.2% | 84.5% | 94.3% |

The reliability of liquid crystal composition is tested by UV, high temperature aging test and VHR test. The smaller the change of VHR data before and after UV and high temperature test, the stronger the ability of anti ultraviolet and high temperature. Therefore, the ability of anti ultraviolet and high temperature resistance is judged by comparing the difference of VHR data of each example and comparison case before and after the test.

In the above experiment, the liquid crystal of the example and the comparative example liquid crystal are respectively poured into the test piece for testing. The VHR represents the voltage retention rate (%), the test conditions are 60±1° C., the voltage is ±5V, the pulse width is 10 ms, and the voltage holding time is 1.667 ms; the test equipment is TOYO Model6254 liquid crystal performance comprehensive tester; the initial value of VHR is the data obtained by testing the test piece without any treatment. The VHR ultraviolet is the VHR value obtained by irradiating the liquid crystal film filled with liquid crystal under normal temperature ultraviolet light for 5000 mj, and the VHR high temperature aging is the VHR value obtained by testing the liquid crystal filled sheet in the high temperature oven at 100° C. for 1 hour. Compared with the corresponding Comparative Example 2, the VHR ultraviolet and VHR high temperature aging values of example 2 are higher than those of the corresponding Comparative Example VHR, especially the VHR ultraviolet value measured after ultraviolet irradiation is significantly higher than that of the corresponding Comparative Example 2, indicating that the liquid crystal composition of example 2 has stronger anti ultraviolet and high temperature resistance than Comparative Example 2, so that the ability of resisting external environmental damage in the working process is also stronger than that of Comparative Example 2, more reliable.

Example 3

The formula and corresponding properties of the liquid crystal composition are as shown in table 8.

TABLE 8

| Formula and corresponding properties of liquid crystal composition of example 3 | | |
|---|---|---|
| Category | Liquid crystal monomer code | Content (%) |
| I | CC-3-V | 34.5 |
| II | CC-2-3 | 8 |
| III | CLY-3-O2 | 6 |
| IV | PYP-Cpr-2 | 3 |
| V | CPY-3-O2 | 11.5 |
| V | CCOY-3-O2 | 3.5 |
| V | PY-3-O2 | 16 |
| V | CCY-3-O2 | 11.5 |
| VII | Sb-1O-O4 | 3 |
| VII | Sc-1O-O4 | 3 |

Δε[1 KHz, 25° C.]: −3.7
Δn[589 nm, 25° C.]: 0.105
Cp: 78° C.
$K_{11}$: 11.9
$K_{33}$: 14.6
$\gamma_1$: 77 mPa · s Example 4

The formula and corresponding properties of the liquid crystal composition are as shown in table 9 below.

TABLE 9

| Formula and corresponding properties of liquid crystal composition of example 4 | | |
|---|---|---|
| Category | Liquid crystal monomer code | Content (%) |
| I | CC-3-V | 34.5 |
| II | CC-2-3 | 8 |
| III | CLY-3-O2 | 10 |
| IV | PYP-Cpr-2 | 3 |
| V | CPY-3-O2 | 11.5 |
| V | CCOY-3-O2 | 7.5 |
| V | PY-3-O2 | 16 |
| VII | Sb-1O-O4 | 3 |
| VII | Sc-1O-O4 | 3 |

Δε[1 KHz, 25° C.]: −3.8
Δn[589 nm, 25° C.]: 0.102
Cp: 70° C.
$K_{11}$: 11.7
$K_{33}$: 13.8
$\gamma_1$: 67 mPa · s Example 5

The formula and corresponding properties of the liquid crystal composition are as shown in table 10 below.

TABLE 10

| Formula and corresponding properties of liquid crystal composition of example 5 | | |
|---|---|---|
| Category | Liquid crystal monomer code | Content (%) |
| I | CC-3-V | 29.5 |
| II | CC-2-3 | 20 |
| III | CLY-3-O2 | 10 |
| IV | PYP-Cpr-2 | 8 |
| V | CPY-3-O2 | 11.5 |
| V | PY-3-O2 | 12 |
| V | CPY-2-O2 | 6 |
| VII | Sc-2O-O4 | 3 |

Δε[1 KHz, 25° C.]: −3.0
Δn[589 nm, 25° C.]: 0.103
$K_{11}$: 11.7
$K_{33}$: 13.2
Cp: 70° C.
$\gamma_1$: 61 mPa · s Example 6

The formula and corresponding properties of the liquid crystal composition are as shown in table 11 below.

TABLE 11

| Formula and corresponding properties of liquid crystal composition of example 6 | | |
|---|---|---|
| Category | Liquid crystal monomer code | Content (%) |
| I | CC-3-V | 29.5 |
| II | CC-2-3 | 20 |
| III | CLY-3-O2 | 10 |
| IV | PYP-Cpr-2 | 2 |
| V | CY-3-O2 | 3 |
| V | CCY-3-O2 | 5 |
| V | PY-3-O2 | 12 |
| V | CPY-3-O2 | 11.5 |
| IX | CCP-3-2 | 4 |
| VII | Sc-1O-O4 | 3 |
| 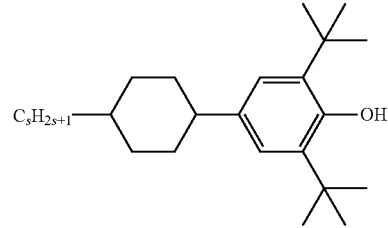 | | 0.03 |

Δε[1 KHz, 25° C.]: −2.8
Δn[589 nm, 25° C.]: 0.103
$K_{11}$: 11.9
$K_{33}$: 13.5
Cp: 75° C.
$\gamma_1$: 74 mPa•s Example 7

The formula and corresponding properties of the liquid crystal composition are as shown in table 12.

TABLE 12

Formula and corresponding properties of liquid crystal composition of example 7

| Category | Liquid crystal monomer code | Content (%) |
|---|---|---|
| I | CC-3-V | 29.5 |
| II | CC-2-3 | 7 |
| III | CLY-3-O2 | 10 |
| IV | PYP-Cpr-2 | 4 |
| V | CCOY-3-O2 | 6 |
| V | CPY-2-O2 | 7 |
| V | PY-3-O2 | 16.5 |
| V | COY-3-O2 | 4 |
| VI | CPP-3-2V1 | 10 |
| VII | Sc-1O-O4 | 3 |
| VIII | CC-4-3 | 3 |

$\Delta\varepsilon$[1 KHz, 25° C.]: −3.0
$\Delta$n[589 nm, 25° C.]: 0.109
$K_{11}$: 12.2
$K_{33}$: 14.4
Cp: 75° C.
$\gamma_1$: 77 mPa·s

Example 8

The formula and corresponding properties of the liquid crystal composition are as shown in table 13 below.

TABLE 13

Formula and corresponding properties of liquid crystal composition of example 8

| Category | Liquid crystal monomer code | Content (%) |
|---|---|---|
| I | CC-3-V | 29 |
| II | CC-2-3 | 7 |
| III | CLY-3-O2 | 10 |
| IV | PYP-Cpr-2 | 4 |
| V | PY-3-O2 | 17 |
| V | CCOY-3-O2 | 10 |
| V | CPY-2-O2 | 7 |
| VI | CPP-3-2V1 | 10 |
| VII | Sb-2O-O4 | 3 |
| VIII | CP-3-O2 | 3 |

$\Delta\varepsilon$[1 KHz, 25° C.]: −3.2
$\Delta$n[589 nm, 25° C.]: 0.111
$K_{11}$: 13.1
$K_{33}$: 14.5
Cp: 80° C.
$\gamma_1$: 80 mPa·s

Example 9

The formula and corresponding properties of the liquid crystal composition are as shown in table 14 below.

TABLE 14

Formula and corresponding properties of liquid crystal composition of example 9

| Category | Liquid crystal monomer code | Content (%) |
|---|---|---|
| I | CC-3-V | 24.5 |
| II | CC-2-3 | 7 |
| III | CLY-3-O2 | 10 |
| IV | PYP-Cpr-2 | 4 |
| V | CCOY-3-O2 | 10 |
| V | PY-3-O2 | 17 |
| V | CPY-2-O2 | 7 |
| VI | CPP-3-2V1 | 10 |

TABLE 14-continued

Formula and corresponding properties of liquid crystal composition of example 9

| Category | Liquid crystal monomer code | Content (%) |
|---|---|---|
| VIII | PP-5-1 | 7 |
| VII | Sb-1O-O4 | 3 |

$\Delta\varepsilon$[1 KHz, 25° C.]: −3.2
$\Delta$n[589 nm, 25° C.]: 0.118
$K_{11}$: 14.5
$K_{33}$: 13.9
Cp: 75° C.
$\gamma_1$: 74 mPa·s

Example 10

The formula and corresponding properties of the liquid crystal composition are as shown in table 15 below.

TABLE 15

Formula and corresponding properties of liquid crystal composition of example 10

| Category | Liquid crystal monomer code | Content (%) |
|---|---|---|
| I | CC-3-V | 24.5 |
| II | CC-2-3 | 7 |
| III | CLY-3-O2 | 10 |
| IV | PYP-Cpr-2 | 4 |
| V | CY-3-O2 | 17 |
| V | CCOY-2-O2 | 6 |
| V | CCOY-3-O2 | 11 |
| VI | CCP-3-O1 | 3.5 |
| VI | CPP-3-2V1 | 10 |
| VII | Sb-1O-O4 | 3 |
| IX | CGPC-3-3 | 4 |

$\Delta\varepsilon$[1 KHz, 25° C.]: −3.4
$\Delta$n[589 nm, 25° C.]: 0.101
$K_{11}$: 15.9
$K_{33}$: 16.5
Cp: 98° C.
$\gamma_1$: 108 mPa·s Obviously, the above-mentioned examples of the present disclosure are only for the purpose of clearly explaining the examples of the present disclosure, rather than limiting the implementation mode of the present disclosure. For ordinary technical personnel in the art, other changes or changes in different forms can be made on the basis of the above description. Here, it is impossible to enumerate all the examples, and all the technologies belong to the present disclosure The obvious changes or changes in the technical scheme are still within the scope of protection of the present disclosure.

The invention claimed is:

1. A liquid crystal composition, wherein the liquid crystal composition comprises a compound represented by formula I, a compound represented by formula II, a compound represented by formula III-2, a compound represented by formula IV-10, three different compounds represented by formula V, a compound represented by formula VI-4, a compound represented by formula VII-10, a compound represented by formula VII-12, and one or more compounds represented by formula VIII except for those represented by formula I and II:

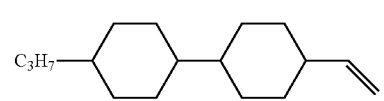

I

-continued

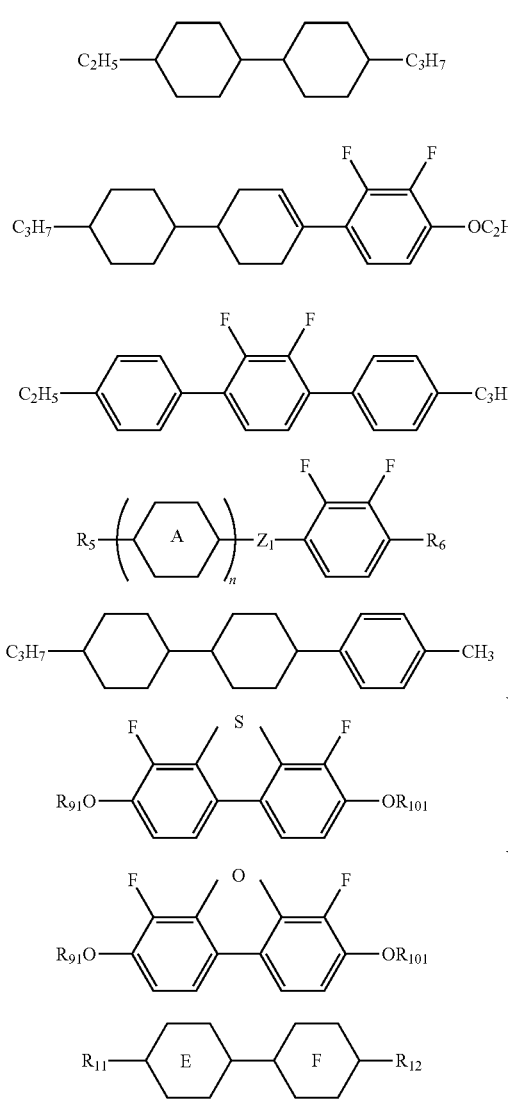

wherein,
R₅ represents alkyl group having a carbon atom number of 1-10; R₆ represents alkoxy group having a carbon atom number of 1-2;
Z₁ represents a single bond;
n represents 1 or 2;
when n represents 1,

represents 1,4-Phenylene, or 1,4-cyclohexylidene;
when n represents 2, two

independently represents 1,4-cyclohexylidene;
R₉₁ and R₁₀₁ independently represent alkyl groups with 2-5 carbon atoms;
R₁₁ represents alkyl group having a carbon atom number of 3-4;
R₁₂ represents alkyl group having a carbon atom number of 1-10 or alkenyl group having a carbon atom number of 2-10;

independently represent 1,4-cyclohexylidene;
a total mass content of the compound represented by formula I is 15%, a total mass content of the compound represented by formula II is 6.5-13.5%, a total mass content of the compound represented by formula III-2 is 12%, a total mass content of the compound represented by formula IV-10 is 8%, a total mass content of the compounds represented by formula V is 24.5%, a total mass content of the compound represented by formula VI-4 is 16%, a total mass content of the compounds represented by formula VII-10 and formula VII-12 is 7%, a total mass content of the compounds represented by formula VIII is 4-11%.

2. The liquid crystal composition according to claim 1, wherein that the compounds represented by formula V are selected from the group consisting of compounds of V-1, V-2 and V-7:

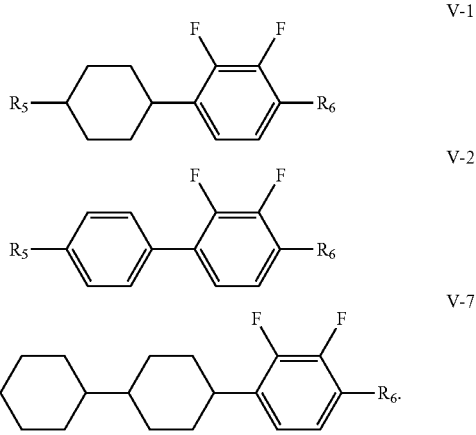

wherein, R₅ represents alkyl group having a carbon atom number of 3.

3. The liquid crystal composition according to claim 1, wherein that the liquid crystal composition also comprises one or more compounds represented by formula IX:

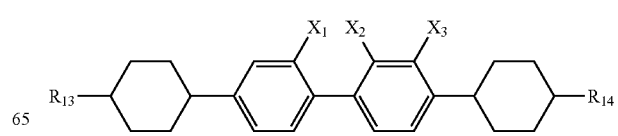

wherein, $R_{13}$ and $R_{14}$ independently represent alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10, alkenyl group having a carbon atom number of 2-10, fluoro-substituted alkenyl group having a carbon atom number of 2-10, alkenoxy group having a carbon atom number of 3-8 or fluoro-substituted alkenoxy group having a carbon atom number of 3-8;

$X_1$, $X_2$, and $X_3$ independently represent H or F.

4. A liquid crystal display element or liquid crystal display, comprising the liquid crystal composition according to claim 1, said liquid crystal display element or liquid crystal display being an active matrix addressing display element or display, or a passive matrix addressing display element or display.

\* \* \* \* \*